FIG. I.

INVENTOR
CARLETON J. MANTHEY
BY
ATTORNEY

INVENTOR
CARLETON J. MANTHEY
BY
Alfred W. Petchaft
ATTORNEY

April 21, 1959  C. J. MANTHEY  2,883,190
SHEET HANDLING UNITS
Filed July 11, 1957  5 Sheets-Sheet 3

INVENTOR
CARLETON J. MANTHEY
BY
Alfred W. Petchaft
ATTORNEY

April 21, 1959

C. J. MANTHEY 2,883,190

SHEET HANDLING UNITS

Filed July 11, 1957

INVENTOR
CARLETON J. MANTHEY
BY
*Alfred W. Petchaft*
ATTORNEY

United States Patent Office 2,883,190
Patented Apr. 21, 1959

2,883,190

SHEET HANDLING UNITS

Carleton J. Manthey, Cool Valley, Mo., assignor to Central States Paper & Bag Co., St. Louis, Mo., a corporation of Missouri Application July 11, 1957, Serial No. 671,303

9 Claims. (Cl. 271—27)

This invention relates to apparatus for handling sheet materials and, more particularly, to machinery for separately picking up and feeding single plastic sheets from a stack of such sheets.

In various manufacturing processes and packaging operations it is convenient or often essential to wrap objects in large sheets of wrapping material which is available in stacks or bundles and, for some reason, must be handled manually rather than by automatic packaging machinery. The fire clay industry is an example of such an industrial packaging problem. Fire clay, for instance, is sold in plastic condition so that it may be troweled or otherwise worked "on the job," so to speak. Hence, the fire clay, after being suitably mixed and plasticized, is passed through an extruding unit to form the blocks which are successively discharged from the extruding unit onto a delivery conveyor. In this condition, the blocks of fire clay contain a high percentage of moisture and, in order to maintain the moisture content of the blocks during shipment and storage, the blocks are usually wrapped in polyethylene or other similar moisture impervious sheet material. Since the clay blocks are rather fragile, this must be done manually. Therefore, as the clay blocks travel along the delivery conveyor, the workmen pick up a large polyethylene sheet from a nearby stack of sheets and manually wrap each block. However, polyethylene sheet materials are frequently difficult to pick up one at a time from a stack and this results in a slowing up of the clay block packaging operation.

It is, therefore, one of the objects of the present invention to provide a sheet handling unit which permits convenient and rapid handling and removal of single sheets of packaging material from a stack of sheets.

It is a further object of the present invention to provide a sheet handling unit of the type stated which can be quickly loaded with a stack of sheets.

With the above and other objects in view, my invention resides in the novel features of form, construction, arrangement, and combination of parts presently described and pointed out in the claims.

Figure 1:
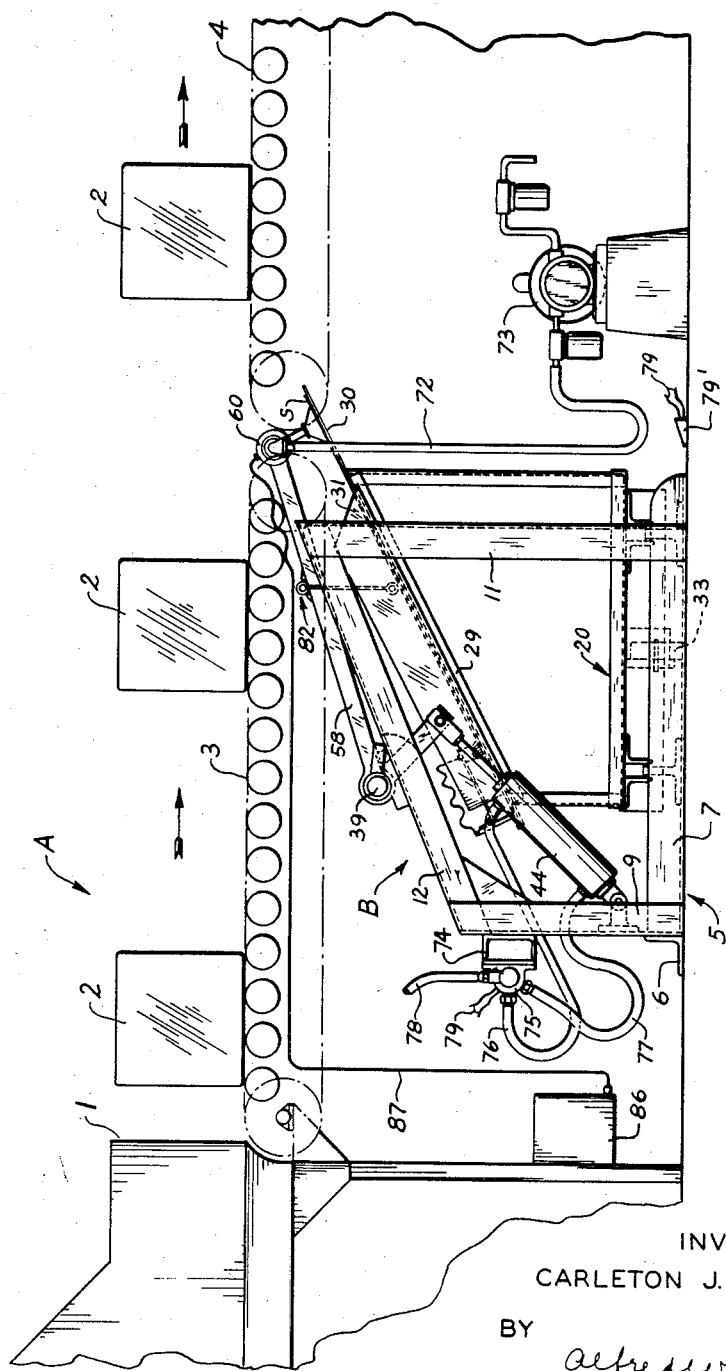
Fig. 1 is a side elevational view of a clay processing apparatus utilizing a sheet handling unit constructed in accordance with and embodying the present invention.

Referring now in more detail and by reference characters to the drawings, which illustrate a preferred embodiment of the present invention, A designates a clay processing apparatus including a clay extruding unit 1 for suitably forming a plurality of clay blocks 2 which are discharged in successive spaced order onto an endless conveyor 3, which, in turn, delivers the blocks 2 to a second endless conveyor 4.

Provided for co-operation with the conveyors 3, 4, is a sheet handling unit B comprising a frame assembly 5 which includes a transverse rear base channel 6 and horizontal side channels 7, 8. Welded to the channels 6, 7, 8, are spaced vertical rear posts 9, 10, and similarly welded to the channel 7 is a vertical front post 11. Welded to the upper ends of the posts 9, 11, is an upwardly and forwardly inclined upper channel 12. Similarly welded to the upper end of the other rear post 10 and cantilevered outwardly therefrom is a second upper channel 13 parallel to, but shorter than, the channel 12. Welded to and extending between the channels 7, 8, are spaced parallel rails 14, 15, and mounted on the rails 14, 15, by means of guide channels 16, 17, 18, 19, is a table frame 20 comprising longitudinal side channels 21, 22, and front and rear channels 23, 24. Welded to the channels 21, 22, 23, 24, are short upstanding rear posts 25, 26, 26', and somewhat longer upstanding front posts 27, 28, 28', which support an upwardly and forwardly inclined table 29 provided with a top 30 which extends forwardly of the posts 27, 28, 28', and rearwardly of the posts 25, 26, 26'. Rigidly secured to the table 29 on one transverse margin thereof is a side plate 31 and welded to the rear margin of the table 29 is an end channel 32. Secured to one end of the channels 16, 17, 18, 19, are floor engaging rollers 33.

Figure 2:
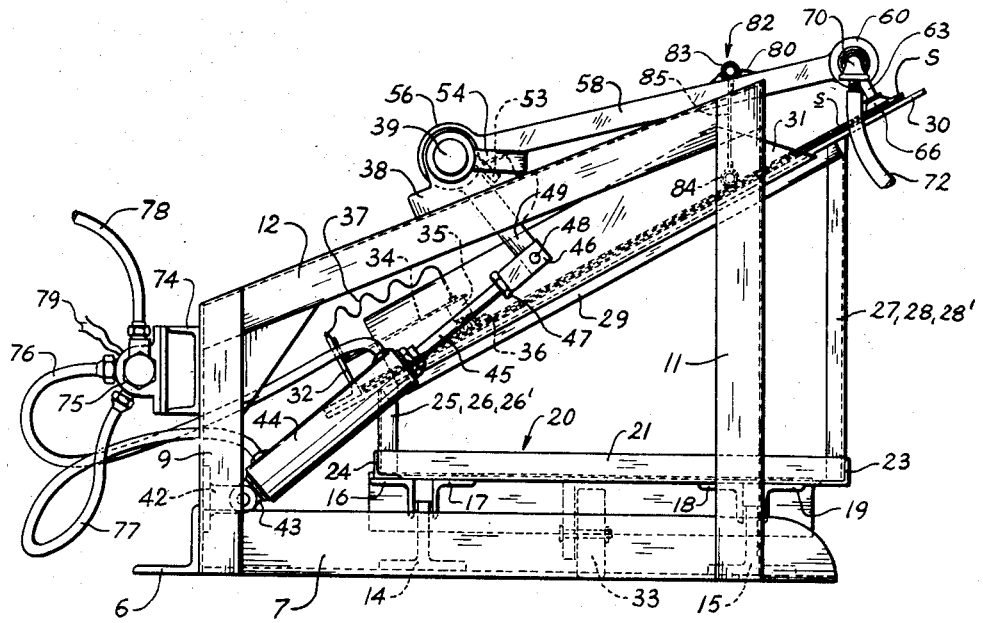
Fig. 2 is a side elevational view of the sheet handling unit.

As best seen by reference to Fig. 2, a stack of polyethylene sheets S may be suitably positioned on the top 30 and held in properly aligned position by means of the side plate 31 and end channel 32. Hingedly mounted on the end channel 32 and extending above the sheets S is a plate 34 provided on its forward end with a transversely extending wooden block 35, the latter being provided with a plurality of very limber brass wire filaments 36, which, in effect, form an electro-conductive brush and bear against the stack of sheets S. The filaments 36 are electrically connected to the end channel 32 by a ground wire 37 for purposes more fully appearing.

Mounted on the inclined channels 12, 13, are aligned pillow blocks 38, 38', and journaled at its ends therein is a shaft 39 provided with set-collars 40, 41, which bear against the pillow blocks 38, 38', and prevent axial shifting of the shaft 39. Welded to the rear post 9 is a bracket 42 which rockably secures one end 43 of an air cylinder 44 having a piston rod 45 projecting outwardly and forwardly therefrom. At its forward end, the piston rod 45 is threadedly engaged in a bifurcated link 46 and secured thereto by means of a nut 47. Secured by means of a pivot pin 48 to the bifurcated link 46 is a connecting arm 49, the upper end of which is welded to a collar 50 which is, in turn, journaled on the shaft 39. Rigidly secured to the shaft 39 on either side of the collar 50 are spacing collars 51, 52, having welded thereto a stop member 53 which is adapted to contact the arm 49, and welded to the set-collars 40, 41, are arms 54, 55, which extend forwardly so as to normally engage the channels 12, 13. Rigidly secured to the shaft 39 are spaced collars 56, 57, provided with spaced parallel arms 58, 59, the outer ends of which are integrally provided with aligned collars 60, 61, for snug-fitting reception of a pipe 62 provided with three spaced downwardly and forwardly inclined tubes 63, 64, 65, the lower ends of which are provided with suction cups 66, 67, 68, which normally engage the stack of plastic sheets S. At one end, the pipe 62 is provided with a reducer 69 and an elbow 70 which is connected to a nipple 71, which is, in turn, connected to a conduit 72. The conduit 72 is connected to a conventional vacuum pump 73 by which a vacuum can be applied at the mouth of the suction cups 66, 67, 68.

Welded to the rear post 9 is a mounting bracket 74 which supports a solenoid operated air valve 75 having discharge lines 76, 77, connected thereto, which, in turn, are connected to the upper and lower ends, respectively, of the air cylinder 44. Also connected to the valve 75 is an inlet line 78 through which air from a suitable compressor (not shown) may be delivered through the valve 75 to the air cylinder 44. The solenoid in the valve 75 is connected by wires 79 to a suitable foot operated switch 79'.

Integrally formed on the arms 58, 59, in rearwardly spaced relation to the collars 60, 61, are upwardly extending stops 80, 81, which abut a freely swingable static eliminator bar 82 comprising vertically spaced horizontally extending pipe members 83, 84, joined by a central web 85, the lower pipe member 84 normally contacting the stack of sheets S. Mounted adjacent the clay extruding unit 1 is a static eliminator power supply 86 which supplies current through a connecting wire 87 to the sheet handling unit B and is connected thereto at the collar 60, so that a charge of electricity is applied to the stack S and is grounded to the handling unit B.

Figure 7:
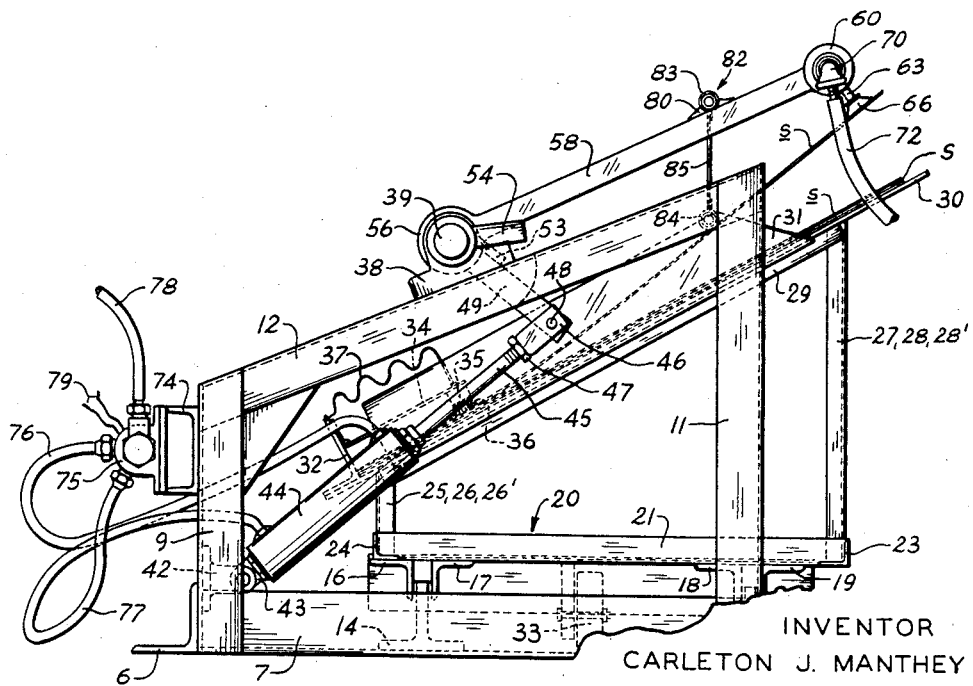
Fig. 7 is a fragmentary side elevational view similar to Fig. 2 and showing the operation of the sheet handling unit.
Figure 3:
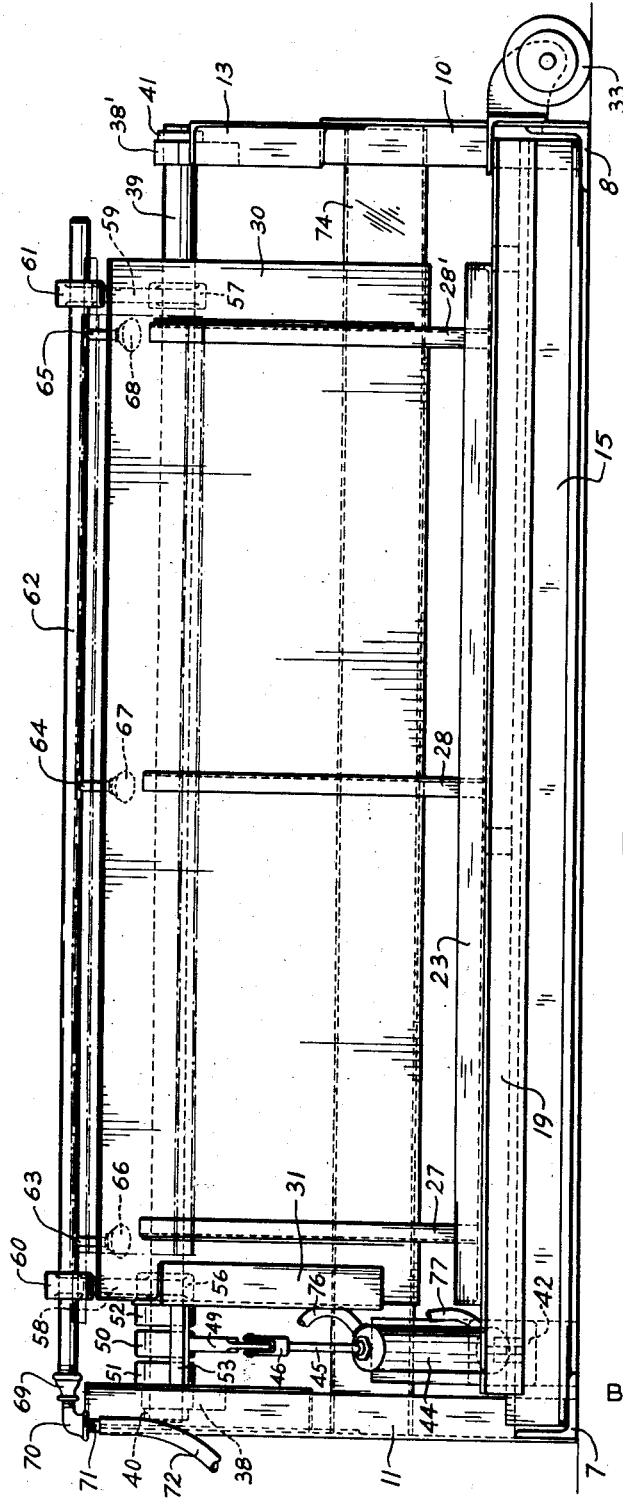
Fig. 3 is a front elevational view of the sheet handling unit shown in Fig. 2.
Figure 4:
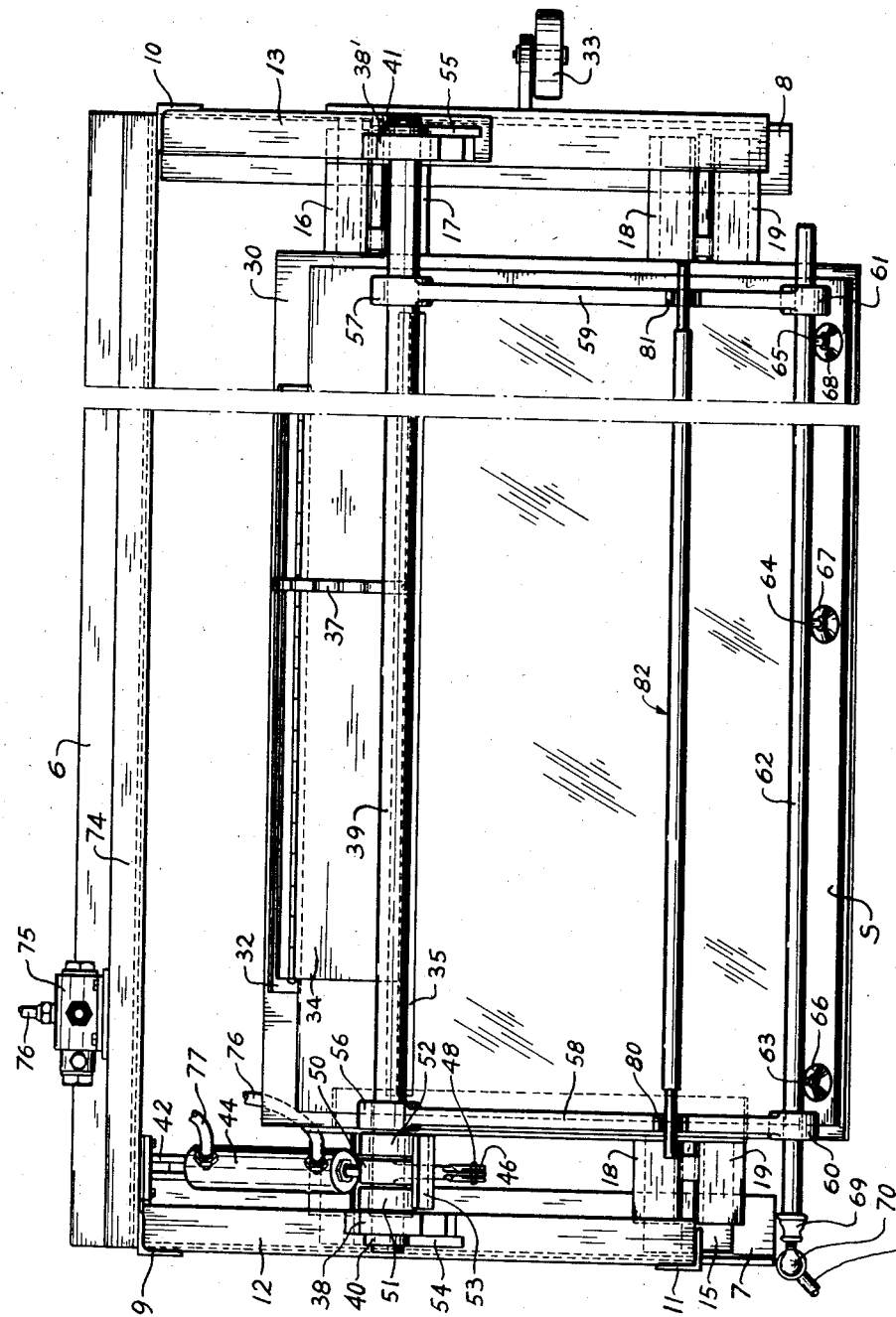
Fig. 4 is a top plan view of the sheet handling unit.
Figure 5:
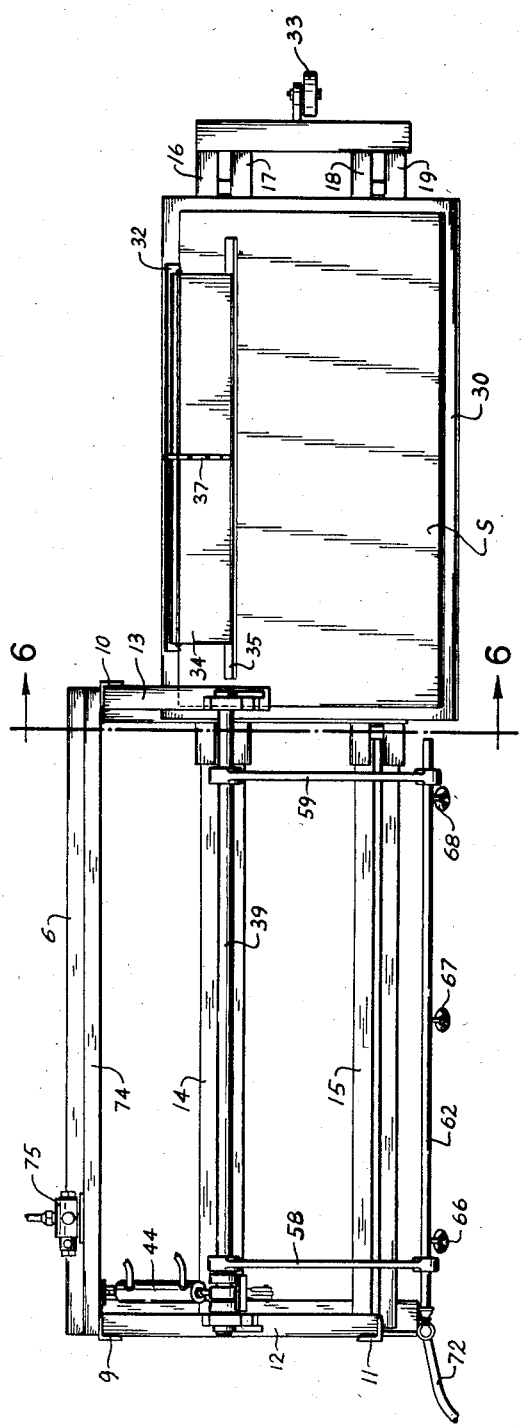
Fig. 5 is a top plan view of the sheet handling unit and showing the table shifted outwardly from the frame assembly.
Figure 6:
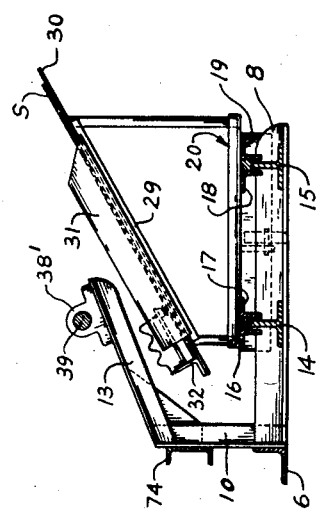
Fig. 6 is a fragmentary sectional view taken along line 6—6 of Fig. 5.

In use, the table frame 20 is shifted along the rails 14, 15, to the position shown in Fig. 5, so that the table top 30 is clear of the short side channel 13; whereupon, the stack of polyethylene sheets S is placed thereon. The table frame 20 is then shifted back so as to lie within the base frame assembly 5. In this position, the suction cups 66, 67, 68, will normally rest adjacent the upper forward margin of the top sheet s. As a block of clay 2 approaches the end of the conveyor 3, the workman actuates the switch 79' which, in turn, opens the air valve 75, admitting air through the conduit 77 and into the cylinder 44. As the piston rod 45 moves outwardly from the cylinder 44, the connecting arm 49 engages the stop member 53, causing the shaft 39 to rotate and elevate the arms 58, 59, the pipe 62, the suction cups 66, 67, 68, and the static eliminator bar 82, upwardly to the position shown in Fig. 7. The vacuum created in the suction cups 66, 67, 68, will lift a portion of the top sheet s upwardly so that it can be grasped by the workman and placed on the conveyor so that the clay block 2 may be placed thereon for subsequent wrapping at some point along the conveyor 4. As the sheet s is gripped and pulled away from the stack S, it will rub against the filaments 36 and the lower pipe member 84 of the static eliminator bar 82. It has been found that by grounding the sheet s through the filaments 36 and by applying a charge of electricity through the static eliminator bar 82 in the manner described, the workman experiences no difficulty in handling a single sheet s. Under certain weather conditions, particularly where the relative humidity is high, it has been found that the handling unit B can be satisfactorily operated without the static eliminator bar 82, in which case it is easily removed from the arms 58, 59. Such conditions can be readily determined by trial and error.

Upon actuation of the switch 79', the suction cups 66, 67, 68, will return to their initial position against the stack of sheets S. In this connection, it should be noted that the suction cups 66, 67, 68, will always bear against the stock of sheets S with substantially the same amount of pressure since the return movement of the arms 58, 59, and the pipe 62 is independent of the length of stroke of the piston rod 45. As the arm 49 moves downwardly, the arms 58, 59, and pipe 62 will move therewith because the arm 49 normally engages the stop member 53. However, upon contact of the suction cups 66, 67, 68, with the stack of sheets S, the arms 58, 59, and pipe 62 will come to rest, leaving the arm 49 to continue movement downwardly until the rear stroke of the piston rod 45 has been completed. In the event that there is no stack S on the table top 30, the suction cups 66, 67, 68, will just rest on the table top 30.

It should be understood that changes and modifications in the form, construction, arrangement, and combination of the several parts of the sheet handling units may be made and substituted for those herein shown and described without departing from the nature and principle of my invention.

Having thus described my invention, what I claim and desire to secure by Letters Patent is:

1. A sheet handling unit comprising an outer frame, a shaft journaled on said outer frame, a hollow transverse member rigidly connected to the shaft and lying in spaced relation thereto, suction cup means operatively connected to said hollow transverse member for gripping the surface of a sheet, means connected to said hollow transverse member for creating a vacuum at said suction cup means, an inner frame slidable in and out of nested position within said outer frame, means on said inner frame adapted to support a stack of sheets, and means for rotating said shaft whereby to permit the suction cup means to lift a portion of a single sheet off of the stack.

2. A sheet handling unit comprising an outer frame, a shaft journaled on said outer frame and having stop means rigidly mounted thereon, a hollow transverse member rigidly connected to said shaft and lying in spaced parallel relation thereto, a plurality of suction cups rigidly connected to said hollow transverse member for gripping the surface of a sheet, an inner frame shiftable in and out of nested position within said outer frame, a surface on said inner frame adapted to support a stack of sheets in underlying relation to the suction cups, static discharge means grounded through said inner frame and adapted to contact the stack of sheets, and pneumatically operated means movable into and out of contact with said stop means whereby to rotate the shaft and lift a portion of a single sheet off of the stack.

3. A sheet handling unit comprising an outer frame, a shaft journaled on said outer frame and having stop means rigidly mounted thereon, a plurality of arms rigidly connected to said shaft and extending outwardly therefrom, a hollow transverse member connecting the outer ends of said arms and lying in spaced parallel relation to said shaft outwardly of the forward margin of said outer frame, a plurality of suction cups rigidly connected to said hollow transverse member, means connected to said hollow transverse member for creating a vacuum at said suction cups, an inner frame shiftable in and out of said outer frame, a surface on said inner frame adapted to support a stack of sheets and having the major portion thereof lying within said outer frame when the inner frame is nested therein, static discharge means grounded through said inner frame and adapted to contact the stack of sheets, and means movable into and out of contact with said stop means whereby to rotate said shaft and elevate the suction cups, thereby lifting a portion of a single sheet off of the stack.

4. A sheet handling unit comprising an outer frame, a shaft journaled on said outer frame and having stop means rigidly mounted thereon, a plurality of arms rigidly connected to said shaft and extending outwardly therefrom, a hollow transverse member connecting the outer ends of said arms, a plurality of suction cups rigidly connected to said hollow transverse member, means connected to said hollow transverse member for creating a vacuum at said suction cups, an inner frame slidable in and out of said outer frame, a flat surface on said inner frame adapted to support a stack of sheets, static discharge means hingedly mounted on said inner frame and adapted to contact the stack of sheets, said static discharge means being grounded through said inner frame, and means movable into and out of contact with said stop means whereby to rotate said shaft and elevate the suction cups, thereby lifting a portion of a single sheet off of the stack.

5. A sheet handling unit comprising an outer frame, a shaft journaled on said outer frame and having stop means rigidly mounted thereon, a plurality of arms rigidly connected to said shaft and extending outwardly therefrom, a hollow transverse member connecting the outer ends of said arms, a plurality of suction cups rigidly connected to said hollow transverse member, means connected to said hollow transverse member for creating a vacuum at said suction cups, an inner frame slidable in and out of said outer frame, a flat surface on said inner frame adapted to support a stack of sheets, a static discharge brush hingedly mounted on said inner frame and adapted to contact the stack of sheets, said static discharge brush being grounded through said inner frame, a connecting member rockably mounted on said shaft and means for moving said connecting member into and out of engagement with said stop means whereby to elevate and lower the suction cups and lift a portion of a single sheet off of the stack.

6. A sheet handling unit comprising an outer frame, a shaft journaled on said outer frame and having stop means rigidly mounted thereon, a plurality of arms rigidly connected to said shaft and extending outwardly therefrom, a hollow transverse member connecting the free ends of said arms, a plurality of suction cups rigidly connected to said hollow transverse member, means connected to said hollow transverse member for creating a vacuum at said suction cups, an inner frame slidable in and out of said outer frame, a flat surface on said inner frame adapted to support a stack of sheets, static discharge means hingedly mounted on said inner frame and adapted to contact the stack of sheets, said static discharge means being grounded through said inner frame, and means movable into and out of contact with said stop means and thereby elevate and lower said suction cups.

7. A sheet handling unit comprising an outer frame, a shaft journaled on said outer frame and having stop means rigidly mounted thereon, a plurality of arms rigidly connected to said shaft and extending outwardly therefrom, a hollow transverse member connecting the free ends of said arms, a plurality of suction cups rigidly connected to said hollow transverse member, means connected to said hollow transverse member for creating a vacuum at said suction cups, an inner frame slidable in and out of said outer frame, a flat surface on said inner frame adapted to support a stack of sheets, an arm rockably mounted on said shaft, static discharge means hingedly mounted on said inner frame and adapted to contact the stack of sheets, said static discharge means being grounded through said inner frame, and pneumatically operated means connected to said arm for shifting said arm into and out of contact with said stop means and thereby elevate and lower said suction cups.

8. A sheet handling unit comprising an outer frame, a shaft journaled on said outer frame and having stop means rigidly mounted thereon, a plurality of arms rigidly connected to said shaft and extending outwardly therefrom, a hollow transverse member connecting the free ends of said arms, a plurality of suction cups rigidly connected to said hollow transverse member, means connected to said hollow transverse member for creating a vacuum at said suction cups, an inner frame slidable in and out of said outer frame, a flat surface on said inner frame adapted to support a stack of sheets, static discharge means hingedly mounted on said inner frame and adapted to contact the stack of sheets, said static discharge means being grounded through said inner frame, an arm rockably mounted on said shaft and pneumatically operated means connected to said arm for shifting said arm into and out of contact with said stop means and thereby elevate and lower said suction cups.

9. A sheet handling unit comprising an outer frame, a shaft journaled on said outer frame and being provided with stop means rigidly mounted thereon, a plurality of arms rigidly connected at one end to said shaft and extending outwardly therefrom, a hollow transverse member connecting the other ends of said arms, a plurality of suction cups rigidly connected to and depending from said hollow transverse member, means connected to said hollow transverse member for creating a vacuum at said suction cups, an inner frame shiftable in and out of nesting position within said outer frame, means on said inner frame for supporting a stack of sheets in underlying relation to the suction cups, an arm rockably mounted on said shaft, and pneumatically operated means operatively connected to said arm for shifting said arm into and out of contact with said stop means, thereby rotating said shaft and shifting said suction cups toward and away from the stack of sheets.

References Cited in the file of this patent

UNITED STATES PATENTS

| | | |
|---|---|---|
| 1,203,030 | Martucci | Oct. 31, 1916 |
| 1,321,365 | Daningburg | Nov. 11, 1919 |
| 1,394,211 | Morgan | Oct. 18, 1921 |
| 1,593,563 | Blaine | July 27, 1926 |
| 1,625,085 | Leach | Apr. 19, 1927 |
| 2,473,751 | Johnson | June 21, 1949 |
| 2,645,479 | Mitchell | July 14, 1953 |